US009979503B2

(12) United States Patent
Zhao et al.

(10) Patent No.: US 9,979,503 B2
(45) Date of Patent: May 22, 2018

(54) SIGNAL TRANSMISSION WITH INTERFERENCE MITIGATION

(71) Applicant: Telefonaktiebolaget L M Ericsson (publ), Stockholm (SE)

(72) Inventors: Zhenshan Zhao, Beijing (CN); Jinhua Liu, Beijing (CN); Hai Wang, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 152 days.

(21) Appl. No.: 14/770,790

(22) PCT Filed: Feb. 28, 2013

(86) PCT No.: PCT/CN2013/072004
§ 371 (c)(1),
(2) Date: Aug. 26, 2015

(87) PCT Pub. No.: WO2014/131180
PCT Pub. Date: Sep. 4, 2014

(65) Prior Publication Data
US 2016/0013878 A1      Jan. 14, 2016

(51) Int. Cl.
*H04J 11/00* (2006.01)
*H04L 5/00* (2006.01)
(Continued)

(52) U.S. Cl.
CPC ........ *H04J 11/0023* (2013.01); *H04L 5/0023* (2013.01); *H04L 5/0048* (2013.01);
(Continued)

(58) Field of Classification Search
None
See application file for complete search history.

(56) References Cited

U.S. PATENT DOCUMENTS

2007/0121554 A1* 5/2007 Luo ................. H04B 1/7107
370/335
2010/0309801 A1* 12/2010 Jongren ............ H04J 11/0023
370/252
(Continued)

FOREIGN PATENT DOCUMENTS

CN    101843028 A    9/2010
EP    2665305 A1    11/2013
(Continued)

OTHER PUBLICATIONS

International Search Report, Application No. PCT/CN2013/072004, dated Dec. 12, 2013.
(Continued)

Primary Examiner — Mohammad S Adhami
(74) Attorney, Agent, or Firm — Sage Patent Group

(57) ABSTRACT

In radio transmission between a mobile communication network and a user equipment, signals are received in a subframe comprising a first group of one or more resource elements and a second group of one or more resource elements. The first group is subject to a first level of interference from at least one further radio channel while the second group is subject to a second level of interference from the at least one further radio channel. A first measurement and a second measurement are performed. Based on the first and second measurements the interference from the at least one further radio channel is estimated and interference mitigation is performed.

19 Claims, 10 Drawing Sheets

(51) Int. Cl.
  *H04L 25/03* (2006.01)
  *H04W 24/10* (2009.01)
  *H04W 72/08* (2009.01)
  *H04L 5/14* (2006.01)

(52) U.S. Cl.
  CPC ....... *H04L 25/03968* (2013.01); *H04W 24/10* (2013.01); *H04W 72/082* (2013.01); *H04L 5/0062* (2013.01); *H04L 5/1469* (2013.01)

(56) References Cited

U.S. PATENT DOCUMENTS

2011/0286346 A1* 11/2011 Barbieri ............... H04B 17/327
                                                              370/252
2012/0069889 A1   3/2012 Molnar et al.

FOREIGN PATENT DOCUMENTS

| WO | WO 2009/027261 A2 | 3/2009 |
| WO | WO 2009/059816 A1 | 5/2009 |
| WO | WO 2011/057037 A2 | 5/2011 |
| WO | WO 2012/061030 A1 | 5/2012 |
| WO | WO 2012/095023 A1 | 7/2012 |
| WO | WO 2012/135978 A1 | 10/2012 |

OTHER PUBLICATIONS

Written Opinion of the International Searching Authority, Application No. PCT/CN2013/072004, dated Dec. 12, 2013.
Catt et al., "New study item proposal for Further Enhancements to LTE TDD for DL-UL Interference Management and Traffic Adaptation", Document for: Approval; Agenda Item: 14.2, 3GPP TSG-RAN Meeting #51, RR-110450, Kansas City, USA, Mar. 15-18, 2010, 6 pp.
Ericsson et al., "Isolated cell performance for LTE TDD traffic adaptation", Document for: Discussion, Agenda Item: 7.9, 3GPP TSG-RAN WG1 #68, R1-120781, Dresden, Germany, Feb. 6-10, 2012, 7 pp.
3GPP, Technical Specification, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.1.0 (Dec. 2012), 108 pp.
Extended European Search Report for European Patent Application No. 13876177.0 (dated Feb. 9, 2017).
Office Action for Chinese Patent Application No. 201380076040.8 (dated Mar. 26, 2018).

* cited by examiner

SIGNAL TRANSMISSION WITH INTERFERENCE MITIGATION

CROSS REFERENCE TO RELATED APPLICATION

This application is a 35 U.S.C. § 371 national stage application of PCT International Application No. PCT/CN2013/072004, filed on Feb. 28, 2013, the disclosure and content of which is incorporated by reference herein in its entirety. The above-referenced PCT International Application was published in the English language as International Publication No. WO 2014/131180 A1 on Sep. 4, 2014.

TECHNICAL FIELD

Various embodiments of the invention relate to a method of signal transmission in a mobile communication network and to a network element of the mobile communication network.

BACKGROUND

Transmission schemes of radio channels of mobile communication networks typically employ a sequence of subframes for transmission, i.e. sending and/or receiving, of data. The data may for example include payload data and control data. Further, also reference signals may be transmitted. That is to say, different types and signals of data may be transmitted.

The subframes may have a well-defined temporal duration, e.g., typically in the millisecond regime, and may comprise a plurality of symbols carrying the data or the reference signals. The symbols may be defined with respect to a time-frequency resource scheme comprising resource elements. The resource elements may be a smallest time-frequency unit used for the transmission on the radio channel. A symbol may include a plurality of resource elements having different frequencies. For example, each resource element of a symbol may occupy a different frequency band (sub-carrier). A certain number of resource elements/symbols may constitute the subframe. Signals received for each resource element by a receiver over the course of time may correspond to the symbols. The symbols may be encoded using a certain encoding scheme, e.g., Orthogonal Frequency-Division Multiplex (OFDM).

The various parameters of the time-frequency resource scheme, e.g., number of resource elements per subframe, number of sub-carriers, temporal duration of a resource element, frequency bandwidth of a subcarrier, and/or allocation of resource elements for various data types, etc., are typically defined within the framework of a certain mobile communication network standard. Furthermore, they may be dependent on a number of parameters, including, but not limited to: uplink data transmission and downlink data transmission.

In general, the various resource elements of a subframe may have different transmission properties such as transmission power used for sending of the respective signals. For example, it is possible that resource elements relating to signals used for transmission of control data (control data resource elements) are sent by a sender using a larger transmission power than resource elements relating to signals used for transmission of payload data (payload data resource elements). Also, it is possible that resource elements relating to signals used for transmission of reference signals (reference signal resource elements) are sent using a larger transmission power than payload data resource elements.

The transmission schemes may support uplink data transmission, i.e., transmission from a user equipment (UE) of a subscriber connected to the mobile communication network; and downlink data transmission, i.e., transmission from the mobile communication network to the UE. Typically, downlink and uplink transmission capacity is allocated using certain schemes which depend on various parameters including certain time and/or frequency allocation schemes for multiplexing between different UEs.

An example of a mobile communications network relying on a radio channel employing subframes is the Third Generation Partnership Project (3GPP) Long Term Evolution (LTE) standard, where details of the subframe are defined in the Technical Specification (TS) 36.211 Version 11.1.0 of December 2012, chapter 4 "Frame structure".

Scenarios are known where a certain degree of flexibility in the transmission properties, in particular the allocation of uplink and downlink transmission capacity for the radio channel, is provided. The transmission properties may relate to one or more of the following: scheduling and timing of the subframes, allocation of resource elements of a subframe for transmission of different types of data such as payload data and/or control data and/or reference signals, transmission power.

For example, it may be possible to dynamically allocate transmission capacity for either downlink transmission or uplink transmission for a radio channel. This may promote fast data transmission and result in tailored network properties depending on the current transmission demand of a particular subscriber. In particular if compared to a static or semi-static allocation of transmission capacity, a more flexible scenario better matching a current data traffic situation may be feasible. System performance may be optimized. Such scenarios are known, e.g., as dynamic Time Division Duplexing (TDD) in the 3GPP environment. See for example 3GPP R1-120781, "Isolated cell performance for LTE TDD traffic adaptation", Ericsson (February 2012).

Yet such scenarios may face certain restrictions. For example, if transmission capacity is individually allocated for various radio channels, i.e., allocation may occur for a given radio channel independently or largely independently of other radio channels, increased interference between the given radio channel and the other radio channels may result, in particular with respect to neighboring radio channels in spatial vicinity.

Therefore, a need exists for techniques which allow for providing transmission on a radio channel with reduced impairment from interference from other radio channels.

SUMMARY

According to an aspect, a method of signal transmission on a radio channel between a UE and a mobile communication network is provided. The method comprises receiving signals in a subframe of the radio channel. The subframe comprises a first group of one or more resource elements and a second group of one or more resource elements. The first group of resource elements is subject to a first level of interference from at least one further radio channel between at least one further UE and the mobile communication network. The second group of resource elements is subject to a second level of interference from the at least one further radio channel. The method further comprises performing a first measurement for at least one of the resource elements of the first group. The method further comprises performing a second measurement for at least one of the resource elements of the second group. The method further comprises, depending on the first measurement and on the second measurement, estimating interference from the at least one further radio channel. The method further comprises, on the basis of the estimated interference, performing interference mitigation on the received signals of the radio channel.

According to a further aspect, a network node of a mobile communication network is provided. The network node comprises an interface configured for receiving signals in a subframe of a radio channel. The subframe comprises a first group of one or more resource elements. The subframe further comprises a second group of one or more resource elements. The first group of resource elements is subject to a first level of interference from at least one further radio channel between at least one further UE and the mobile communication network. The second group of resource elements is subject to a second level of interference from the at least one further radio channel. The network node further comprises at least one processor which is configured to perform a first measurement for at least one of the resource elements of the first group and to perform a second measurement for at least one of the resource elements of the second group. The processor is further configured to, depending on the first measurement and on the second measurement, estimate interference from the at least one further radio channel. The processor is further configured to, on the basis of the estimated interference, perform interference mitigation on the received signals of the radio channel.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION

Figure 1A:
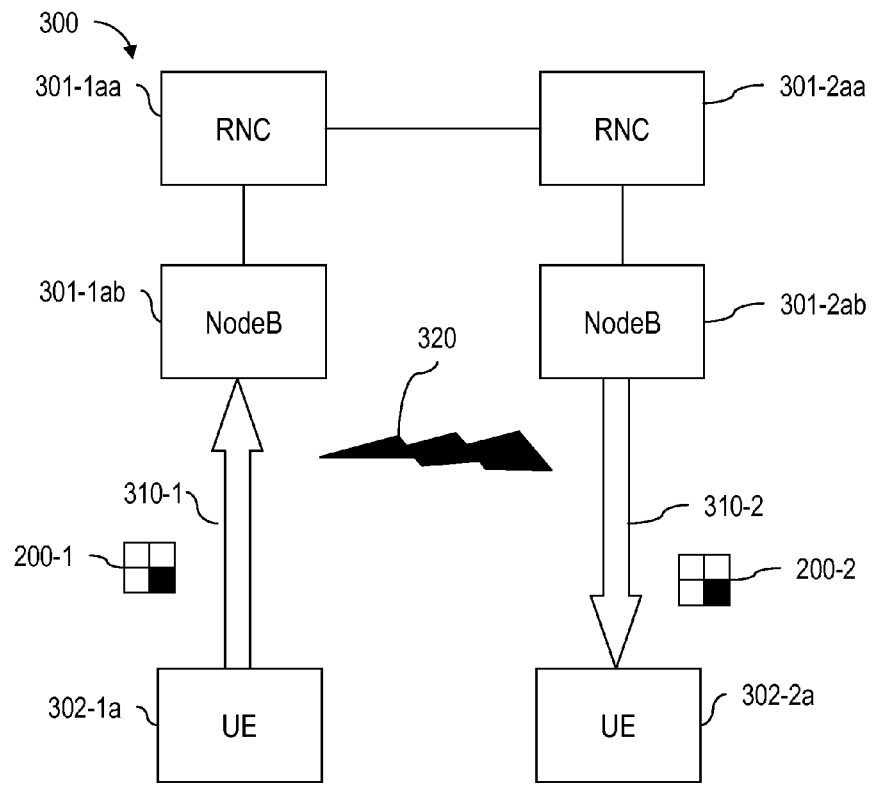
FIG. 1A is a schematic illustration of an uplink radio channel and a downlink radio channel in a mobile communication network according to the 3GPP Universal Mobile Telecommunications System standard.

In the following, various embodiments will be described in detail with reference to the accompanying drawings. The drawings are to be regarded as schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

More specifically, the illustrated embodiments relate to techniques and concepts of signal transmission on a radio channel of a mobile communication network which include interference mitigation. The interference mitigation may increase transmission reliability and decrease a likelihood of transmission errors. Impairment due to interference may be reduced. This may, in particular, enable a dynamic allocation of transmission capacities of the radio channel, e.g., independently from a neighboring and interfering at least one further radio channel.

The interference mitigation is performed taking into account interference from the at least one further radio channel. For example, the at least one further radio channel may be a radio channel establishing a wireless data connection between network elements of the mobile communication network in spatial vicinity to the network elements establishing a wireless data connection using the radio channel. The interference may then be caused by joint usage of a given frequency bandwidth (frequency re-use) by both the radio channel and the further radio channel. While typically the interference can act in both ways, i.e., from the radio channel to the at least one further radio channel and vice versa, hereinafter the discussion will focus on the interference imposed by the at least one further radio channel to the radio channel. However, it should be understood that corresponding concepts and techniques may be readily applied to other scenarios such that this discussion is not limiting.

Hereinafter, techniques of interference mitigation are discussed with respect to a scenario where the radio channel employs subframes comprising a first group of one or more resource elements and a second group of one or more resource elements, wherein the first group of resource elements is subject to a first level of interference from the at least one further radio channel and wherein the second group of resource elements is subject to a second level of interference from the at least one further radio channel. For example the second level of interference may be larger or smaller than the first level of interference.

A first measurement is performed for at least one of the resource elements of the first group. A second measurement is performed for at least one of the resource elements of the second group. From the first and second measurements the interference from the at least one further radio channel is estimated and, based on the estimated interference, interference mitigation is performed. Interference mitigation relates to interference cancellation and/or interference compensation.

Such techniques are based on the finding that in mobile communication networks, e.g., using the 3GPP LTE or the IGPP Universal Mobile Telecommunications System (UMTS) radio access technology, typically a certain predictability and awareness of the interference situation is possible. For example, the interference from the at least one further radio channel can be assumed to cause different levels of interference for different groups of resource elements of the radio channel. This is because of the predefined resource schemes defining a temporal alignment between various resource elements of the radio channel and the at least one further radio channel.

By performing the measurements for the different groups of resource elements, it becomes possible to deduce the interference from the at least one further radio channel in a manner which distinguishes between various resource elements. This may better reflect a temporal dependency of the interference.

In particular, it is possible to determine, i.e., single out the interference from the at least one further radio channel from various further contributions of interference, such as intra-channel interference and/or additive white Gaussian noise (AWGN).

There are different possibilities to formally describe the interference from the at least one further radio channel. One possibility is that the estimated interference from the at least one further radio channel is proportional to a signal covariance contribution for reception of the radio channel and caused by the at least one further radio channel. The following explanations mainly relate to this formalism. Yet, it should be understood that this is not to be taken limiting and other possibilities of considering interference formally may be readily applied by a person skilled in the art upon reading and understanding of the techniques described herein.

It should be understood that the predictability and/or awareness of the different levels of interference do not need to be explicitly provisioned, e.g., stored as information on a network node. Rather, the different levels of interference may be inherent to a corresponding system, e.g., by general system design rules such as transmission schemes, time-frequency resource schemes, temporal alignment of various network elements including network nodes, preset rules, or the like.

Various scenarios are conceivable where the first and second groups of resource elements of the subframe of the radio channel are subject to different levels of interference. In general, such a scenario may occur if the radio channel and the interfering at least one further radio channel employ different and/or time-shifted time-frequency resource schemes of the resource elements. Particular examples include, but are not limited to: the radio channel being allocated for uplink transmission and the at least one further radio channel being allocated for downlink transmission; the radio channel being allocated for downlink transmission and the at least one further radio channel being allocated for uplink transmission; the radio channel and the at least one further radio channel both being allocated for either uplink transmission or downlink transmission and the subframes of the radio channel being time-shifted against the subframes of the at least one further radio channel. In the following, mainly the first scenario of this listing will be used for description of techniques according to various embodiments, but it should be understood that these techniques may be readily applied to other scenarios by the skilled person upon reading and understanding of the description hereinafter.

In such scenarios, the interference from the at least one further radio channel may change over time during the duration of a subframe of the radio channel. This is because the various resource elements of a subframe of the at least one further radio channel may have different transmission properties, e.g., transmission power, and thereby may cause the different levels of interference. Because the time-frequency resource schemes of the resource elements of the radio channel and of the at least one further radio channel are different and/or time-shifted with respect to each other, this results in the variable level of interference for different resource elements of the radio channel.

It should be understood that such a scenario where the level of interference changes over time during the duration of a subframe, i.e., on a relatively short characteristic time-scale, may be distinct from other scenarios where slow changes occur, i.e., changes on a long characteristic time-scale corresponding to a duration longer than the duration of a subframe. The latter scenario may for example correspond to a situation with comparably slowly moving UEs, slowly changing transmission conditions such as environmental conditions, or the like.

A particular example of an interference situation as discussed above is shown FIG. 1A. In FIG. 1A, an uplink radio channel 310-1 experiences interference 320 from a downlink radio channel 310-2. The uplink radio channel 310-1 establishes a wireless data connection between a UE 302-1$a$ and an access node of the mobile communication network 300. In the scenario of FIG. 1A, the access node is implemented by a NodeB 301-1$ab$ according to the 3GPP UMTS standard. The NodeB 301-1$ab$ communicates with a radio network controller (RNC) 301-1$aa$ according to the 3GPP UMTS standard. The RNC 301-1$aa$ performs certain control functionalities with respect to the NodeB 301-1$ab$.

In a similar manner, the downlink radio channel 310-2 is established between a NodeB 301-2$ab$ and a UE 302-2$a$. The NodeB 301-2$ab$ is controlled by an RNC 301-2$aa$. The RNCs 301-1$aa$, 301-2$aa$ communicate with each other using techniques as defined in the 3GPP UMTS standard framework.

The uplink radio channel 310-1 employs a time-frequency resource scheme 200-1, and the downlink radio channel 310-2 employs a further time-frequency resource scheme 200-2 which is different from the time-frequency resource scheme 200-1. For example, according to the 3GPP UMTS standard, the time-frequency resource scheme 200-1 for the uplink radio channel 310-1 may be inherently different to the time-frequency resource scheme 200-2 for the downlink radio channel 310-2. This results in a situation as described above where different groups of resource elements of the uplink radio channel 310-1 experience different levels of interference 320 from the downlink radio channel 310-2.

Figure 1B:
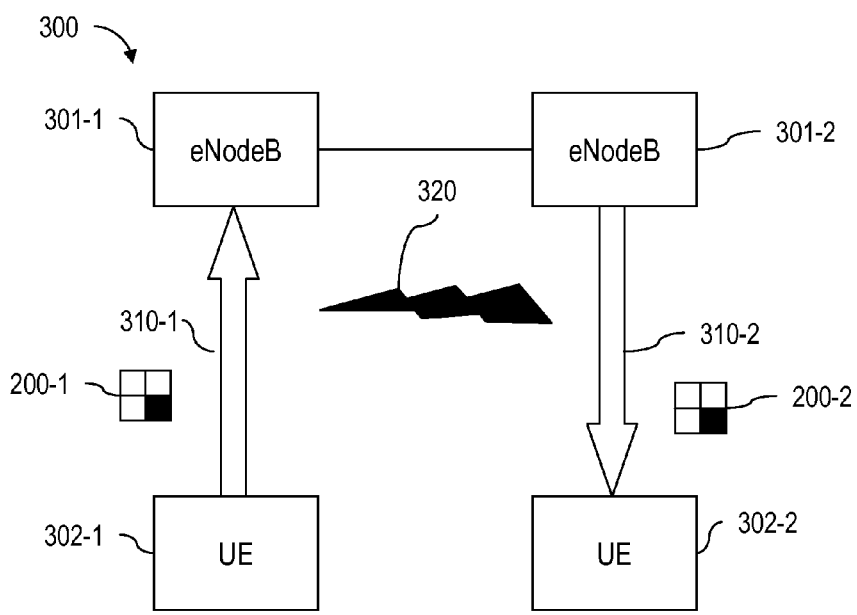
FIG. 1B is a schematic illustration of an uplink radio channel and a downlink radio channel in a mobile communication network according to the 3GPP LTE standard.

In FIG. 1B, a scenario comparable to the scenario as described above with respect to FIG. 1A is described in the context of the 3GPP LTE standard. The uplink radio channel 310-1 is established between the UE 302-1 and an evolved NodeB (eNodeB) 301-1. The downlink radio channel 310-2 is established between the eNodeB 301-2 and the UE 302-2. The eNodeBs 301-1, 301-2 communicate with each other using techniques as defined in the 3GPP LTE standard framework.

In the following, techniques according to various embodiments of the invention will be described with respect to the scenario depicted in FIG. 1B. Therefore, reference will be made to a scenario where the uplink radio channel 310-1 experiences the interference 320 from the downlink radio channel 310-2 in a scenario according to the 3GPP LTE standard. However, it should be understood that techniques as described above and hereinafter can be applied in a corresponding manner to other scenarios.

Figure 1C:
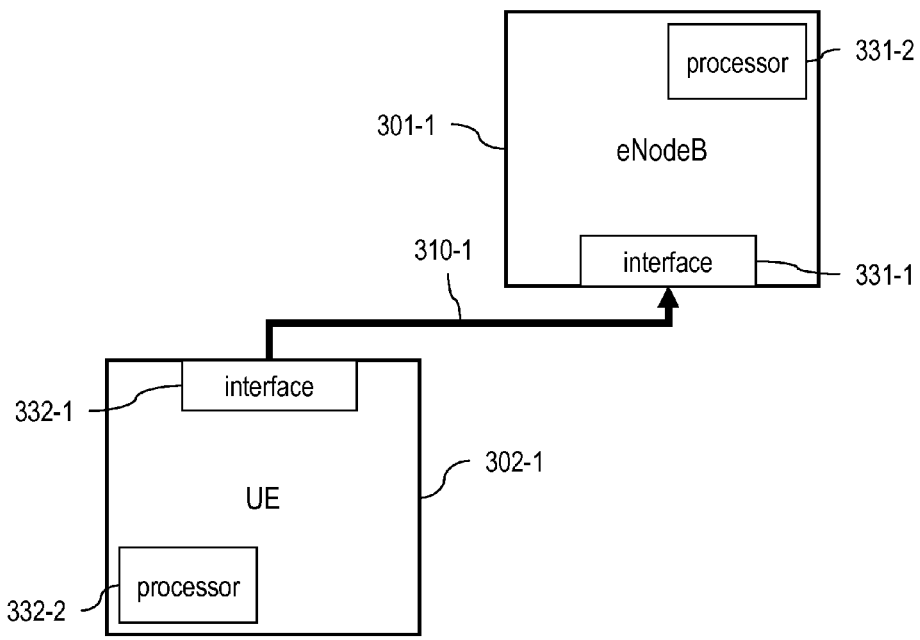
FIG. 1C schematically illustrates in further detail an access node and a UE establishing the uplink radio channel of FIG. 1C.

As can be seen from FIG. 1C, the UE 302-1 comprises an interface 332-1 and a processor 332-2, e.g., a single core processor or multi-core processor. The eNodeB 301-1 comprises an interface 331-1 and a processor 331-2, e.g., a single core processor or multi-core processor and/or a system or cluster of processors in different physical entities. The eNodeB 301-1 is further connected to the eNodeB 301-2 and a core network of the mobile communication network 300 (not shown in FIG. 1C). The processor 331-1 of the eNodeB 301-1 and/or the processor 332-2 of the UE 302-1 are configured to execute a variety of functions including, but not limited to: uplink and downlink scheduling, decoding and encoding of symbols, and performing interference mitigation. In the following, details of such techniques will be explained.

For example, it is possible that signals received by the eNodeB 301-1 are transmitted on the uplink radio channel 310-1 using Orthogonal Frequency-Division Multiplexing (OFDM) encoding. For OFDM encoding, equalization is known in general to the skilled person in order to compensate for interference. Said performing of the interference mitigation can include applying equalization to the received signals. Equalizer weights of the applied equalization can be determined individually for the received signals relating to resource elements of the first group and for signals relating to resource elements of the second group, based on the estimated interference from the at least one downlink radio channel 310-2.

When using OFDM encoding, performing equalization may be comparably feasible due to reduced computational efforts needed. The subcarriers of a resource scheme may have a narrow spectral bandwidth. Such a scenario is sometimes referred to as flat fading. Simple equalization, e.g., by multiplication of each received signal associated with a particular resource element with a complex number, may be possible.

Furthermore, it is possible dynamically distribute the transmission capacity between uplink and downlink allocation employing dynamic TDD techniques. When employing the dynamic TDD techniques, the scenario as described above with respect to FIG. 1B is likely to occur, i.e., where the radio channel 310-1 is configured for uplink transmission and the radio channel 310-2 is configured for downlink transmission. In such a scenario, the interference 320 may be particularly large if the radio channels 310-1, 310-2 are used for transmission in a close spatial vicinity.

Figure 1D:
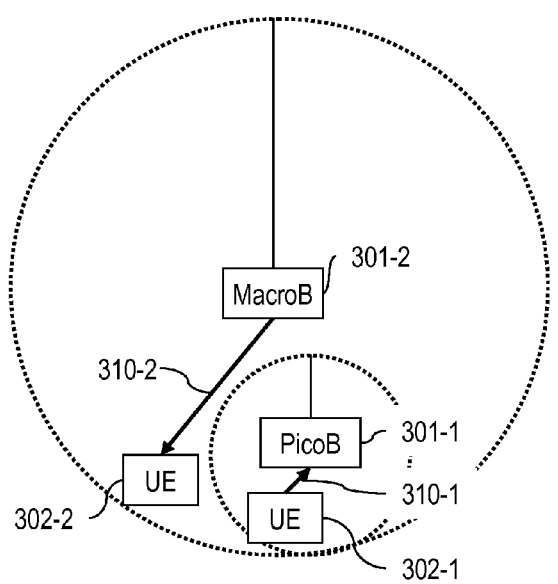
FIG. 1D is a schematic illustration to a Heterogeneous Network in which the uplink radio channel of any one of the FIGS. 1A, 1B, 1C may be employed.

This may in particular occur for so-called Heterogeneous Networks (HetNets), cf. FIG. 1D. In HetNets, an access node, e.g., the eNodeB 302-1, with comparably large coverage, also referred to as Macro Base Station, is supplemented by one or more access nodes, e.g., the eNodeB 301-1, of lower transmission power which hence have a smaller coverage (cell size). Latter low-power access nodes are sometimes referred to as pico access nodes and can be deployed closer to the end users, e.g., on street level. Pico access nodes may be situated preferably in areas encountering large amounts of data traffic where there is a large demand for capacity. The pico access nodes can then reduce the load imposed on the macro access node and thereby help to increase overall throughput. Often, pico and macro nodes have at least partially overlapping cells.

In HetNets, a situation where the pico access nodes share the same frequency bands with the macro access nodes often occurs. In particular, a so-called frequency re-use of 1 is often employed where, both, macro and pico access nodes share the entire spectrum to maximize throughput. In other words: different signals may be transmitted via the same frequency band. Due to the overlapping cells, a situation of increased interference 320 may occur.

In FIG. 1D, an application of the 3GPP LTE standard scenario as discussed above with respect to FIG. 1B employing a HetNet architecture is graphically depicted. The eNodeB 301-2 forms a macro cell while the eNodeB 301-1 forms a pico cell. Respectively, the eNodeB 301-2 is labeled MacroB in FIG. 1D; the eNodeB 301-1 is labeled PicoB in FIG. 1D. Due to the overlapping macro and pico cells and the close spatial vicinity between the radio channels 310-1, 310-2, the interference 320 may be significant in a scenario of FIG. 1D.

This may be in particular true as in various reference implementations the transmission power used for signal transmission on the downlink radio channel 310-2 between the macro base station 301-2 and the corresponding UE 302-2 may exceed the transmission power used for transmission of signals between the pico base station 301-1 and the corresponding UE 302-1. For example, the transmission power employed for sending of signals on the downlink radio channel 310-2 may amount to 46 dBm while the transmission power employed for sending signals on the uplink radio channel 310-1 may amount to 23 dBm. The scenario discussed above with respect to FIG. 1D may also be referred to as base station-base station interference: This is because sending of signals of the downlink radio channel 310-2 by the eNodeB 301-2 causes the interference 320 at the eNodeB 301-1 receiving signals transmitted on the uplink radio channel 310-1. The interference 320 is also possible to occur in a scenario referred to as UE-UE interference: This would be the case where the radio channel 310-2 is an uplink channel between the UE 302-2 and the eNodeB 301-2, and the radio channel 310-1 is a downlink channel between eNodeB 301-1 and the UE 302-1. In this scenario, signals received by the UE 302-1 transmitted on the radio channel 310-1 would be subject to interference from the uplink radio channel 310-2 between the UE 302-2 and the eNodeB 301-2.

Above, various scenarios of system architectures in the mobile communication network 300 have been discussed where the interference 320 is likely to occur to a significant extent leading to, e.g., bit errors in the transmission on the uplink radio channel 310-1. Formal approaches are known which allow describing channel properties and, based on the channel properties, interference present on the uplink radio channel 310-1. This is explained below with reference to the FIGS. 2A and 2B.

Figure 2A:
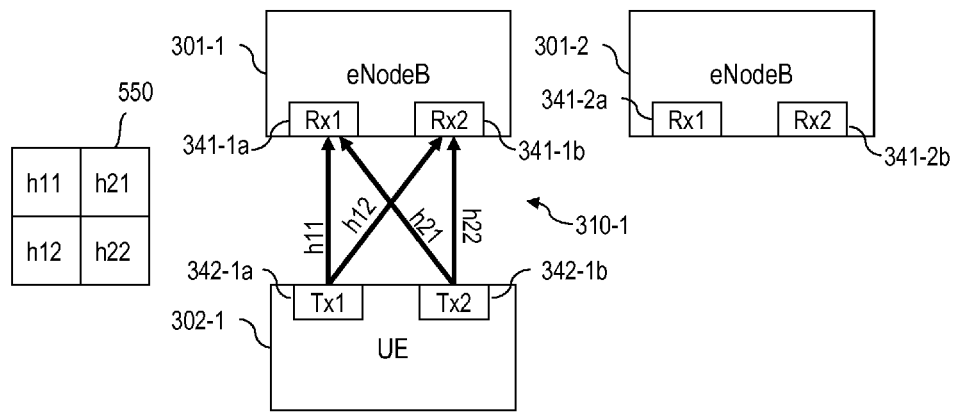
FIG. 2A illustrates channel properties for the uplink radio channel of any one of the FIGS. 1A-1D.
Figure 2B:
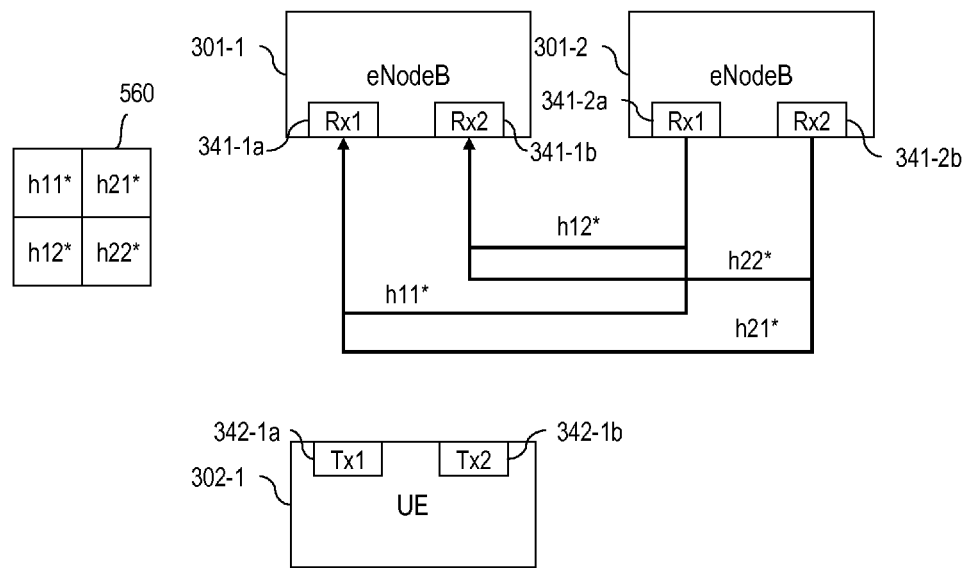
FIG. 2B illustrates channel properties for interference of the uplink radio channel from the downlink radio channel according to any one of the FIGS. 1A-1D.

In FIGS. 2A, 2B, an implementation is shown where the eNodeB 301-1 comprises two transceivers 341-1a, 341-1b labeled Rx1 and Rx2, respectively. Furthermore, the eNodeB 301-2 comprises two transceivers 341-2a, 341-2b labeled Tx1 and Tx2, respectively. Furthermore, the UE 302-1 comprises two transceivers 342-1a, 342-1b labeled Tx1 and Tx2, respectively. It should be understood that, in general, a larger number of transceivers or a smaller number of transceivers, in particular only a single transceiver, may be employed. A case where a plurality of transceivers is employed is sometimes referred to as Multiple Input Multiple Output (MIMO).

In FIG. 2A, a channel matrix 550 relating to the various transmission paths between the sending transceivers 342-1a, 342-1b of the UE 302-1 and the receiving transceivers 341-1a, 341-1b of the eNodeB 301-1 is graphically illustrated. Likewise, in FIG. 2B, the channel matrix 560 between the sending transceivers 341-2a, 341-2b of the eNodeB 301-2 and the receiving transceivers 341-1a, 341-1b of the eNodeB 301-1 is graphically illustrated. The description of channel characteristics using the channel matrices 550, 560 is in general known the skilled person such that there is no need describe further details in this context.

It should be understood that it may be possible to estimate a signal present on the uplink radio channel 310-1 due to sending of the UE 302-1 based on the channel matrix 550 by $P_{UL} \cdot h_{UL} h_{UL}^H$ where $P_{UL}$ is the transmission power used for sending of signals on the uplink radio channel 310-1 and $h_{UL}$ is the channel matrix 550.

Likewise, it is possible to estimate the interference 320 from the downlink radio channel 310-2 which is present on the uplink radio channel 310-1 by $P_{DL} \cdot h_{DL}^* h_{DL}^{H*}$ where $P_{DL}$ is the transmission power used for sending of signals on the downlink radio channel 310-2 and $h_{DL}^*$ is the channel matrix 560.

Different techniques exist to estimate the channel matrices 550, 560. For example, the channel matrix 550 may be estimated from reference signals detected as part of a measurement for reference signal resource elements of the uplink radio channel 310-1. Likewise, it is possible to estimate the channel matrix 560 from reference signals detected as part of a measurement for reference signal resource elements of the downlink radio channel 310-2. The reference signals may be predetermined signals which enable to calculate the channel matrices 550, 560, e.g., from a comparison of the measurement and the predetermined signals.

Figure 3A:
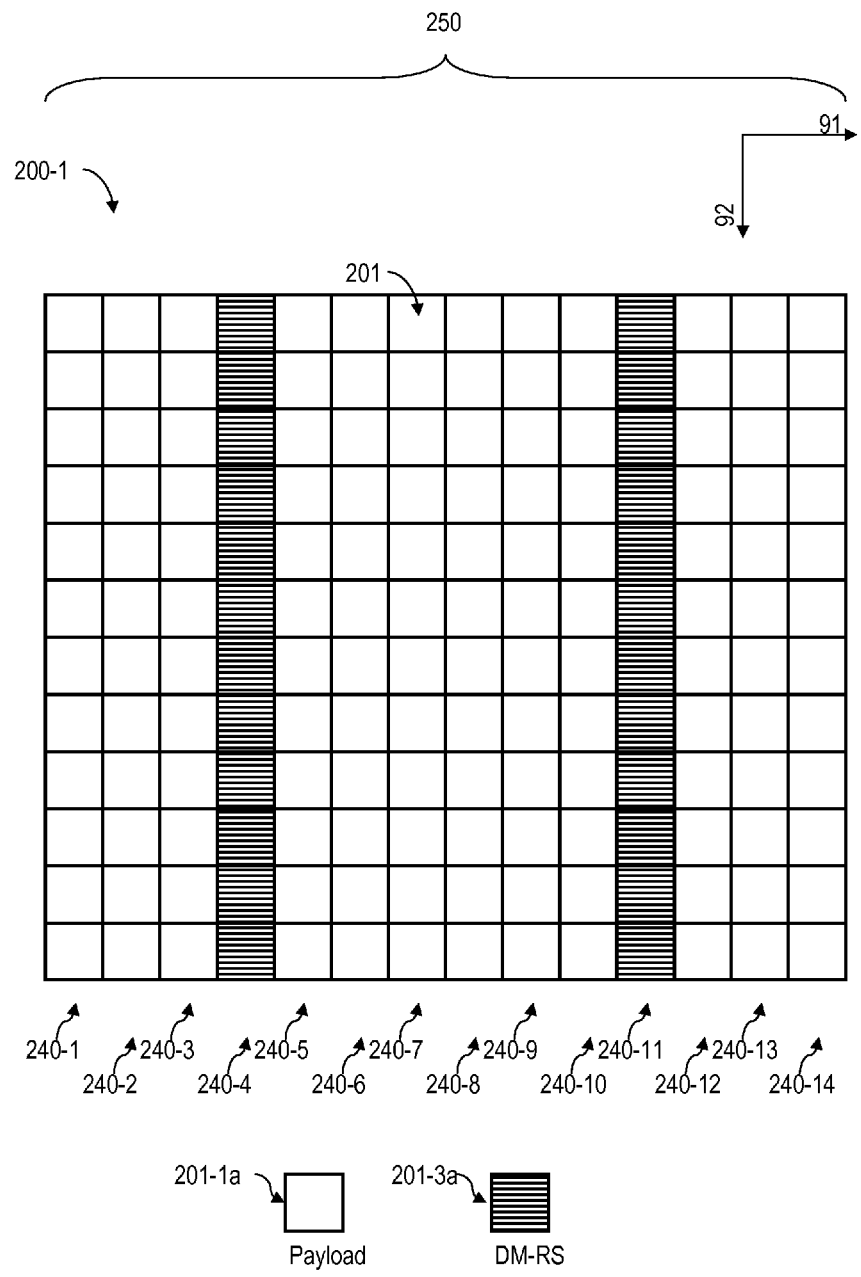
FIG. 3A illustrates resource elements of a subframe used for transmission on an uplink radio channel.

With reference to FIG. 3A, such reference signal resource elements 201-3a may be transmitted as part of the time-frequency resource scheme 200-1 on the uplink radio channel 310-1. The resource scheme 200-1 as depicted in FIG. 3A illustrates the allocation of resource elements 201 for transmission of payload data—as part of the payload data resource elements 201-1a—and for transmission of the reference signals—as part of the reference signal resource elements 201-3a. The resource scheme 200-1 is defined, both in time-space (horizontal axis t in FIG. 3A) and frequency-space (vertical axis f in FIG. 3A). Various symbols 240-1-240-14, each including a number of twelve resource elements 201 corresponding to the different subcarriers, constitute a subframe 250. As can be seen from FIG. 3A, the symbols 240-4 and 240-11 comprise only reference signal resource elements 201-3a.

The resource scheme 200-1 as depicted in FIG. 3A may find particular application in an uplink radio channel according to the 3GPP LTE standard. The reference signals are referred to as Demodulation Reference Signal (DM-RS).

Figure 3B:
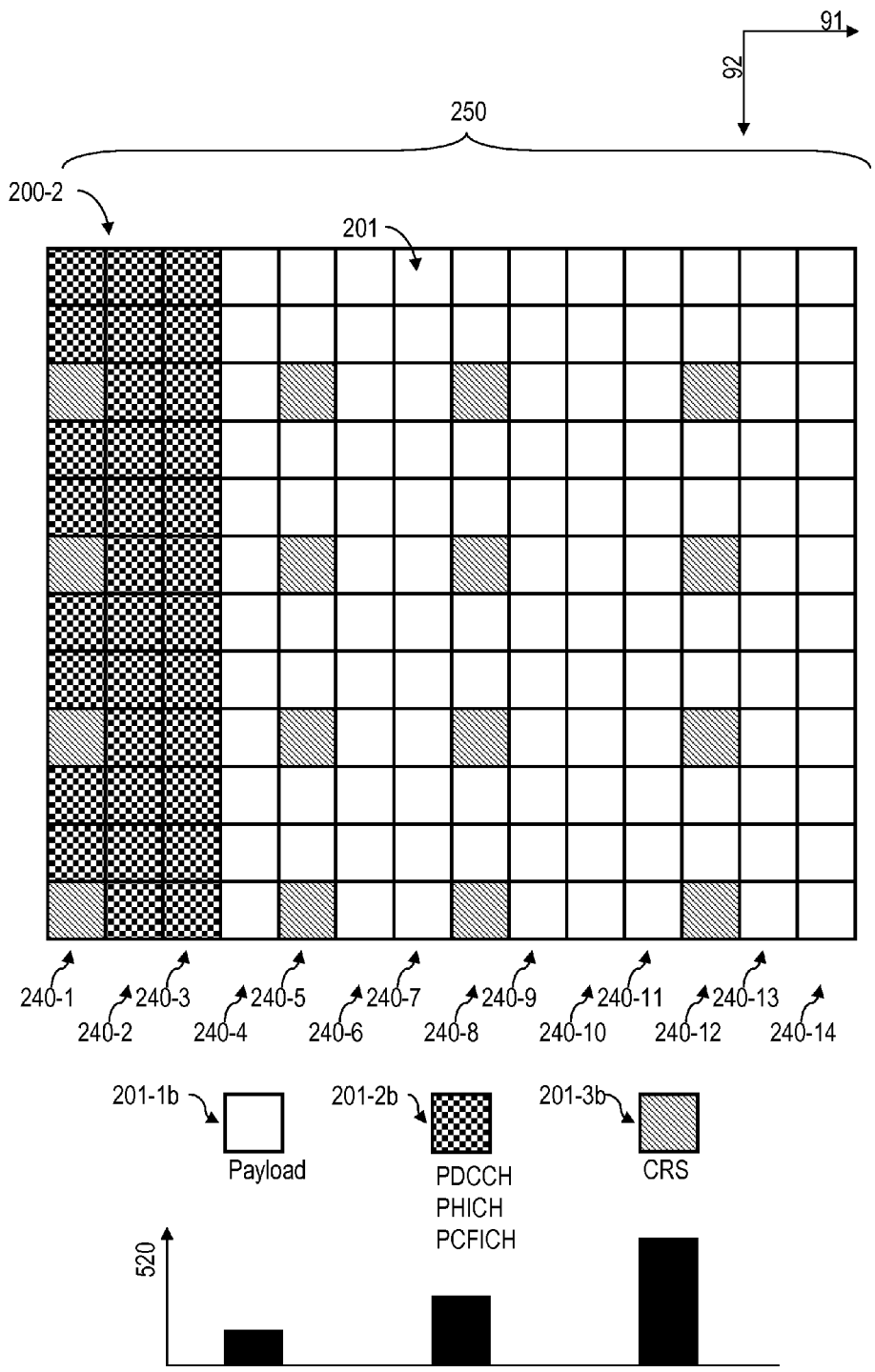
FIG. 3B illustrates resource elements of a subframe used for transmission on a downlink radio channel.

In FIG. 3B, reference signal resource elements 201-3b are transmitted as part of the time-frequency resource scheme 200-2 on the downlink radio channel 310-2. The resource scheme 200-2 as depicted in FIG. 3B may find particular application in a downlink radio channel according to the 3GPP LTE standard, see, e.g., 3GPP TS 36.211, V10.2.0 of 2011-6, Figure 6.10.1.2-1. The reference signals 201-3b are referred to as Cell-specific Reference Signal (CRS).

In FIG. 3B, furthermore control data resource elements 201-2b are depicted. The control data resource elements 201-2b are referred to as Physical Downlink Control Channel (PDCCH), Physical Hybrid-ARQ Indicator Channel (PHICH), and Physical Control Format Indicator Channel (PCFICH).

Both the resource schemes 200-1, 200-2 of FIGS. 3A and 3B include payload resource elements 201-1a, 201-1b, respectively, used for transmission of payload data to and from the UEs 302-1, 302-2.

In the lower part of FIG. 3B, it is indicated that the various types of resource elements 201-1b, 201-2b, 201-3b are transmitted on the downlink radio channel 310-2 using different transmission powers 520. In particular, the transmission power 520 may be largest for the reference signal resource elements 201-3b and smallest for the payload resource elements 201-1b. Because of the different transmission powers 520, depending on a temporal alignment between the resource schemes 200-1 and 200-2, the various resource elements 201 of the uplink radio channel 310-1 may be subject to different levels of interference 320 from the downlink radio channel 310-2 (cf. FIG. 1B).

It should be understood that the particular allocation of resource elements 201 as discussed above with respect to the FIGS. 3A, 3B is merely exemplary and may vary in various scenarios. For example, in the case of a 3GPP LTE mobile communication network 300 it is known to vary the number of control data resource elements 201-2b transmitted per subframe 250. For example, in the scenario of FIG. 3B, there is a total of 32 control data resource elements 201-2b transmitted per subframe 250. In particular, the symbols 240-1, 240-2, 240-3 all include control data resource elements 201-2b. Depending on a control format indicator (CFI), the number of resource elements 201 allocated for the transmission of the control data resource elements 201-2b may vary. For example, the CFI may take values of 1, 2, or 3—and accordingly, only the first, the first two, or the first three symbols 240-1, 240-2, 240-3 of the subframe 250 may carry the control data resource elements 201-2b. Depending on the CFI, it may be possible to obtain different groups of resource elements 201. Furthermore, it is possible that the reference signal resource elements 201-3b are allocated differently for different transceivers 341-2a, 241-2b in the MIMO scenario.

Figure 4A:
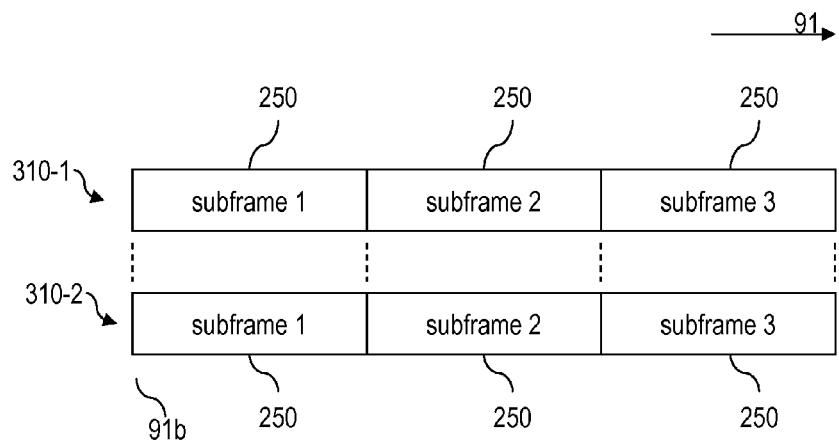
FIG. 4A illustrates a temporal alignment between subframes of two radio channels.
Figure 4B:
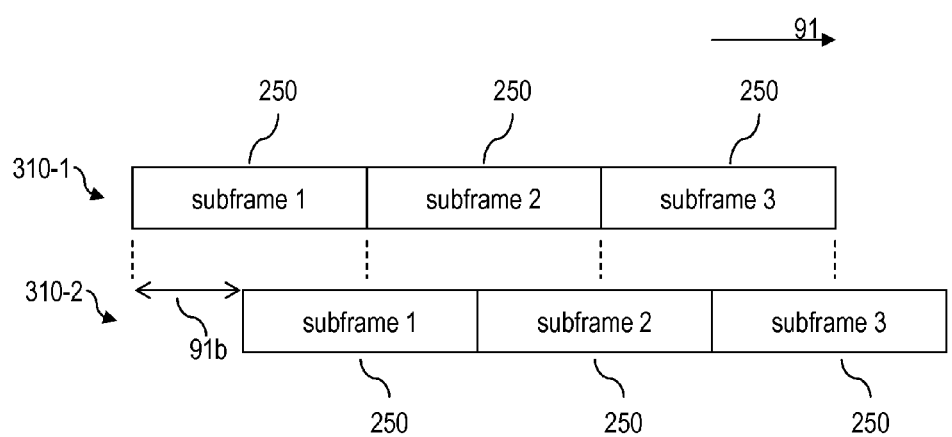
FIG. 4B illustrates a further temporal alignment between subframes of two radio channels.

In FIGS. 4A and 4B, the temporal alignment of the subframes 250 of the radio channel 310-1 with respect to subframes 250 of the downlink radio channel 310-2 is graphically indicated. In FIG. 4A the subframes 250—and therefore the time—frequency resource schemes 200-1, 200-2—are synchronized in time. Synchronized in time may correspond to synchronized within predefined specifications or error margins which may amount to, e.g., a few percent or less than 1% of the entire subframe duration. In case of the 3GPP LTE TDD scenario, different participating access nodes may be synchronized in time at an accuracy of ±1.5 µs. In FIG. 4B, a time-shift ΔT is present (indicated in FIG. 4B by the horizontal arrow).

While FIGS. 4A and 4B illustrate possibilities of temporal alignment of the subframes 250 of the radio channels 310-1, 310-2, it should be understood that also a frequency shift between the resource elements 201 of the different radio channels 310-1, 310-2 is possible. For example, in the case of the 3GPP LTE network a 7.5 kHz frequency shift between sub-carriers of the uplink radio channel 310-1 and the downlink radio channel 310-2 can exist. In the following, this frequency shift is not considered—however, it is possible to consider this frequency shift the estimation of the interference 320.

Figure 5:
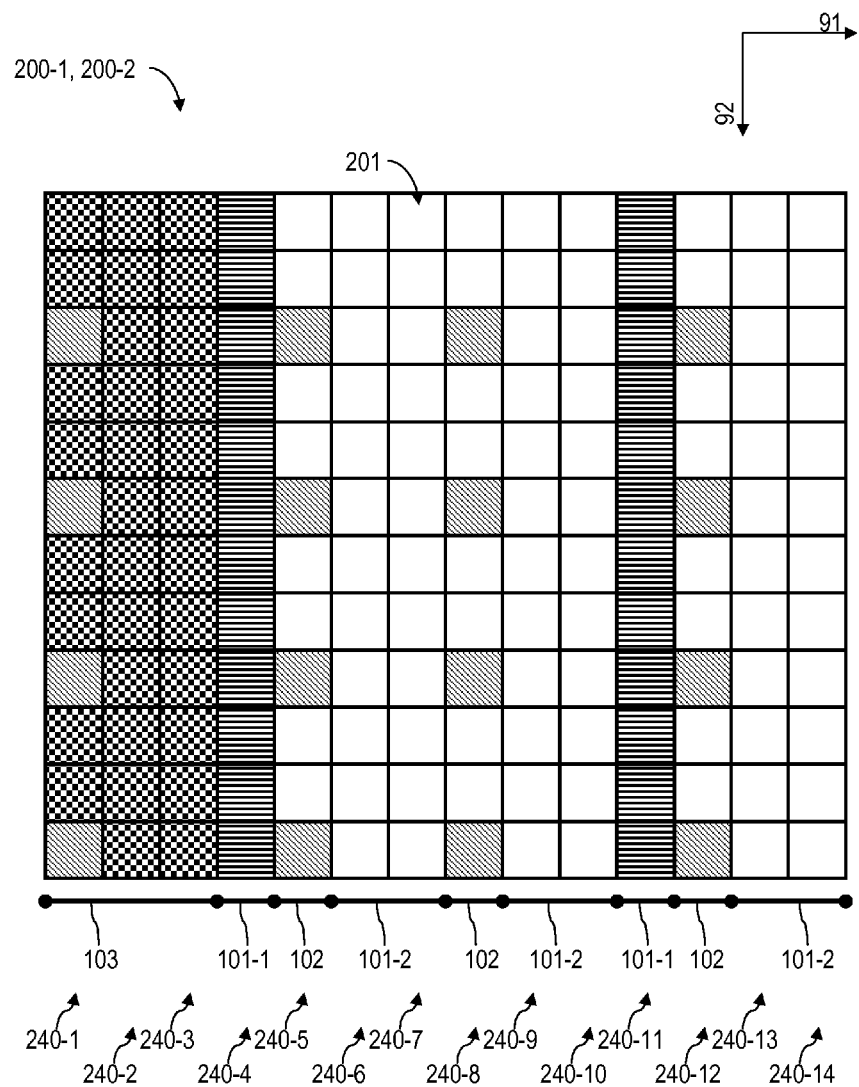
FIG. 5 shows resource elements of the subframes of both FIGS. 3A and 3B in a combined view.

For the scenario of FIG. 4A, i.e., synchronization of the subframes 250 of the radio channels 310-1, 310-2, a combined view of the resource schemes 200-1, 200-2 is illustrated in FIG. 5.

In FIG. 5, three groups 101-1/101-2 and 102 and 103 of resource elements 201 of the uplink radio channel 310-1 are illustrated. The resource elements of the first group 101-1/101-2 are coincident with payload resource elements 201-1b of the downlink radio channel 310-2. Therefore, they are subject to a first level of interference 320. The resource elements 201 of the second group 102 are coincident with reference signal resource elements 201-3b of the downlink radio channel 310-2. Therefore, they are subject to a second level of interference 320.

In other words and more generally speaking: the first level of interference 320 is due to data transmission on the downlink radio channel 310-2 and the second level of interference 320 is due to transmission of reference signals on the downlink radio channel 310-2.

The first group 101-1/101-2 of resource elements 201 of a radio channel 310-1 may be formally subdivided into two subgroups 101-1, 101-2. The first subgroup 101-1 relates to the reference signal resource elements 201-3a of the uplink radio channel 310-1; the second subgroup 101-2 relates to the payload resource elements 201-1a of the uplink radio channel 310-1.

For example, the data transmission on the downlink radio channel 310-2 typically employs a first transmission power; the reference signal transmission on the downlink radio channel 310-2 typically employs a second transmission power which is larger than the first transmission power. This results in the first and second levels of interference 320; in particular, typically the second level of interference 320 is larger than the first level of interference 320.

To capture this particular interference situation, measurements 801, 802, 803 are performed during the duration of a subframe 250. In other words: the interference 320 is measured in a time-resolved manner over the duration of the subframe 250. In FIG. 5 it is shown that a first measurement 801 is performed for one of the resource elements 201 of the first group 101-1/101-2. Furthermore, it is shown that a second measurement 802 is performed for one of the resource elements 201 of the second group 102. Furthermore, it is shown to perform a third measurement 803 for one resource element 201 of the third group 103. In particular, it is possible to perform the first measurement 801 for a reference signal resource element 201-3a transmitting reference signals of the uplink radio channel 310-1, i.e., for a resource element 201 of the first subgroup 101-1.

The resource elements 201 of the third group 103 are coincident with control data resource elements 201-2b of the downlink radio channel 310-2. Therefore, they are subject to a third level of interference 320.

The first group 101-1/101-2 of resource elements 201 includes the symbols 240-4, 240-6, 240-7, 240-9, 240-10, 240-11, 240-13, 240-14. The second group 102 of resource elements 201 includes the symbols 240-5, 240-8, 240-12. The third group 103 of resource elements 201 includes the symbols 240-1, 240-2, 240-3.

It should be understood that, depending on these various parameters, a different grouping—both with respect to the number of groups and with respect to the resource elements 201 being contained in each group—may apply. The grouping of resource elements may in general reflect the various levels of interference present on the radio channel 310-1 and caused by the downlink radio channel 310-2.

Figure 6A:
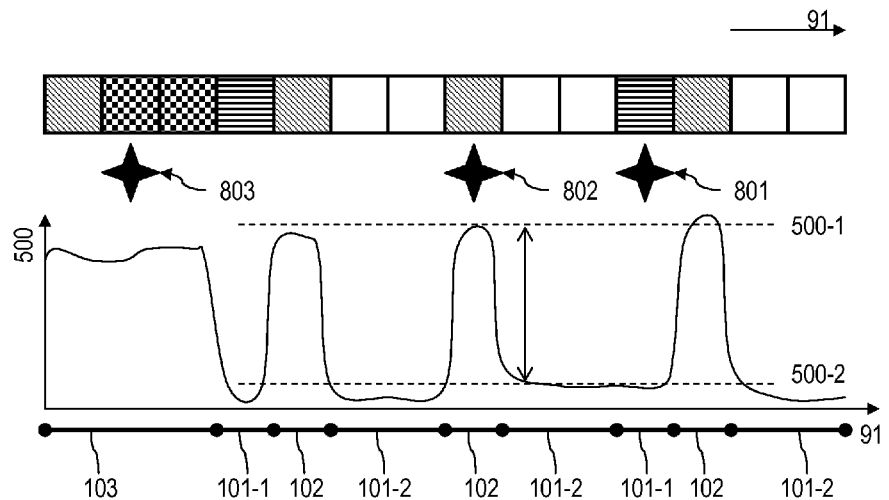
FIG. 6A illustrates a power level for various resource elements of the uplink radio channel exhibiting interference from the downlink radio channel, assuming an exemplary scenario which is based on a subframe structure as illustrated in FIGS. 3A and 3B.
Figure 6B:
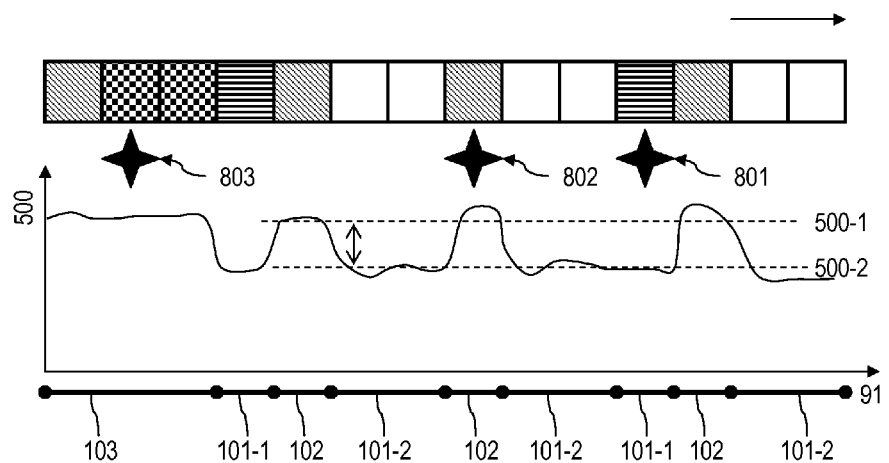
FIG. 6B illustrates the power level of FIG. 6A for a further exemplary scenario.

The various levels of interference 320 may have an implication on the power level 500 received by the eNodeB 301-1 over the course of time (cf. FIGS. 6A and 6B). For example, if no payload is currently transmitted on the downlink radio channel 310-2, the power level 500 may take a qualitative form as illustrated in FIG. 6A. A large power level 500-1 is obtained for the resource elements 201 of the second and third groups 102, 103. A small power level 500-2 is obtained for the resource elements 201 of the first group 101-1/101-2. The difference between the power levels 500-1, 500-2 is illustrated with the vertical arrow in FIG. 6A.

If, however, payload data is currently transmitted on the radio channel 500-2 a situation as depicted in FIG. 6B may be obtained. The difference between the power levels 500-1, 500-2 (illustrated with the vertical arrow in FIG. 6B) is smaller if compared to the situation of FIG. 6A.

From a comparison of the FIGS. 6A and 6B it becomes apparent that a difference between the various levels of interference 320 from the downlink radio channel 310-2 may be larger or smaller—depending on various parameters, e.g., if there is payload data currently being transmitted on the downlink radio channel 310-2 and/or depending on a difference of transmit power used for transmission of the payload data and the reference signals on the downlink radio channel 310-2. Taking this into account, it may be possible to selectively execute said performing of the interference mitigation, preferably or only in such cases, where the first and second levels of interference 320 between different resource elements 201 vary considerably, i.e., where a significant time dependence of the interference 320 from the downlink radio channel 310-2 exists.

For example, the method can further comprise comparing the power level 500-1 of the first measurement 801 and the power level 500-2 of the second measurement 802. The method can further comprise, depending on said comparison, selectively performing the interference mitigation on the received signals on the basis of the estimated interference 320 from the at least one further radio channel 310-2. For example, if the power levels 500-1, 500-2 of the first and second measurements 801, 802 exhibit a difference which is larger than a predefined threshold, it may be possible to perform the interference mitigation. Likewise, if the difference between the power levels 500-1, 500-2 of the first and second measurements 801, 802 is smaller than the predefined threshold, it may be assumed that the interference 320 from the at least one further radio channel 310-2 is approximately constant over the duration of the subframe 250 or does not vary significantly such that there would be no large need for the resource-element resolved interference mitigation. Therefore, it may be expendable to perform the interference mitigation taking into account the second and third levels of interference 320. Rather, the interference mitigation performed, e.g., solely, on the basis of the first measurement 801, e.g., considering the reference signals transmitted on the uplink radio channel 310-1 which may be representative for the interference situation over the entire duration of the subframe 250.

In some scenarios, the different levels of the interference 320 from the downlink radio channel 310-2 and present on the uplink radio channel 310-1 may be exploited in order to single out interference 320 from other contributions to the overall signal. This is achieved by performing the individual measurement 801, 802, 803 for the resource elements 201 of the three groups 101-1/101-2, 102, 103. A generalized underlying idea of such techniques may be formulated as follows: on the short characteristic time-scale, e.g., of the duration of a subframe 250, the interference 320 from the downlink radio channel 310-2 varies due to the different time-frequency resource schemes 200-1, 200-2. Yet, other contributions of interference, e.g., AWGN and intra-channel interference may not show such a fast and/or characteristic variation on this characteristic time-scale and/or may follow known dependencies. Therefore, by performing the two measurements 801, 802 with the two levels of interference 320 from the downlink radio channel 310-2, it may be possible to distinguish and single-out the contribution of interference 320 from the downlink radio channel 310-2 against the other contributions. In the following, a simple scenario is discussed where no control data resource elements 201-2b are transmitted on the downlink radio channel 310-2. Yet it should be understood that the respective techniques may be readily applied to cover the control data resource elements 201-2b as well.

The first measurement 801 reflects the first level of interference 320 from the downlink radio channel 310-2 and further reflects channel characteristics 550 of the uplink radio channel 310-1, e.g., according to the equation:

$$\hat{R}_1 = P_{UL} \cdot h_{UL} h_{UL}^H + R_n, \quad (1)$$

where $R_n$ reflects the AWGN present on the uplink radio channel 310-1 and other kinds of inter-cell interference; e.g., a UE in another cell may send data on another UL radio channel which then may contribute to $R_n$. In the equation 1, the first measurement 801 reflects the signal covariance $\hat{R}_1$ for the first group 101-1/101-2 of resource elements 201.

As can be seen, the first measurement 801 does not include a contribution of the interference 320 from the downlink radio channel 320-2. In other words: the first level of interference 320 from the downlink radio channel 310-2 is estimated to be zero.

The second measurement 802 reflects the second level of interference 320 from the downlink radio channel 310-2 and further reflects the channel characteristics 550 of the uplink radio channel 310-1, e.g., according to the equation:

$$\hat{R}_2 = P_{UL} \cdot h_{UL} h_{UL}^H + \hat{R}_{DL,CRS} + R_n, \quad (2)$$

where $\hat{R}_{DL,CRS}$ reflects the interference 320 caused by the reference signal resource elements 201-3b of the downlink radio channel 310-2. In the equation 2, the second measurement 802 reflects the signal covariance $\hat{R}_2$ for the second group 102 of resource elements 201.

The third measurement 803 reflects the third level of interference 320 from the downlink radio channel 310-2 and further reflects the channel characteristics 550 of the uplink radio channel, e.g., according to the equation:

$$\hat{R}_3 = P_{UL} \cdot h_{UL} h_{UL}^H + \hat{R}_{DL,PDCCH} + R_n, \quad (3)$$

where $\hat{R}_{DL,PDCCH}$ reflects the interference 320 caused by the control data resource elements 201-2b of the downlink radio channel 310-2. In the equation 3, the third measurement 803 reflects the signal covariance $\hat{R}_3$ for the second group 102 of resource elements 201.

As can be seen from the equations 1, 2, and 3, the second and third signal covariances $\hat{R}_2$ and $\hat{R}_3$ include contributions from the channel characteristics 550, 560 of the uplink radio channel 310-1 and from the interference 320 from the downlink radio channel 310-2. Latter interference 320 is proportional to a signal covariance contribution caused by the downlink radio channel 310-2.

It is possible to estimate the interference 320 from a difference of the first measurement 801 and the second measurement 802. The second level of interference 320 for the second group 102 of resource elements 201 can be obtained from $$\hat{R}_{\Delta 12} = \hat{R}_2 - \hat{R}_1 = \hat{R}_{DL,CRS}. \quad (4)$$

Likewise, the third level of interference 320 for the third group 103 of resource elements 201 can be obtained from $$\hat{R}_{\Delta 13} = \hat{R}_3 - \hat{R}_1 = \hat{R}_{DL,PDCCH}. \quad (5)$$

The first level of interference 320 for the first group 101-1/101-2 of resource elements 201 may be obtained directly from the first measurement 801—e.g., by measuring the covariance $\hat{R}_1$ in equation 1. This is because there is no significant signal interference 320 from the downlink radio channel 310-2 present for the resource elements 201 of the first group 101-1/101-2 (cf. FIGS. 6A, 6B).

Based on the above, it is possible to perform interference mitigation—e.g., in the form of interference compensation—by calculating the equalizer weights from the estimated interference 320. In particular, a Minimum Mean Square (MMSE) equalizer can be used in order to perform the interference compensation. Yet it should be understood that similar techniques may be readily applied using other equalization techniques.

For the symbols 240-4, 240-6, 240-7, 240-9, 240-9, 240-10, 240-11, 240-13, 240-14 in the first group 101-1/101-2 of resource elements 201 (cf. FIG. 5), the equalizer weight $W_{group1}$ is:

$$W_{group1} = \hat{h}_{UL}^H (\hat{h}_{UL} \hat{h}_{UL}^H + \hat{R}_n)^{-1}. \quad (6)$$

For the symbols 240-5, 240-8, 240-12 in the second group 102 of resource elements 201 (cf. FIG. 5), the equalizer weight $W_{group2}$ is given by:

$$W_{group2} = \hat{h}_{UL}^H (\hat{h}_{UL} \hat{h}_{UL}^H + \hat{R}_{DL,CRS} + \hat{R}_n)^{-1}. \quad (7)$$

For the symbols 240-1, 240-2, 240-3 in the third group 103 of resource elements 201 (cf. FIG. 5), the equalizer weight $W_{group3}$ is given by:

$$W_{group3} = \hat{h}_{UL}^H (\hat{h}_{UL} \hat{h}_{UL}^H + \hat{R}_{DL,PDCCH} + \hat{R}_n)^{-1}. \quad (8)$$

As can be seen, said performing of the interference mitigation includes receiving of the reference signals of the uplink radio channel 310-1 in order to obtain the channel properties of the uplink radio channel 310-1, i.e., the channel matrix 550. In particular, the reference signals of the uplink radio channel 310-1 may be detected based on the first measurement 801. The interference mitigation is performed on the basis of the received reference signals of the radio channel, e.g., by considering the channel matrix 550 in the above equations 6-8.

As can be seen from the above, the interference mitigation, e.g., based on the equations 6-8, is performed separately for the first group 101-1/101-2 of the resource elements 201 and for the second group 102 and for the third group 103 of the resource elements 201, respectively. In more general terms: the interference mitigation is performed in a time-resolved manner where for various points in time during the duration of a subframe 250 the interference 320 from the downlink radio channel 310-2 is estimated and mitigated. This has the effect that a very precise interference mitigation is possible—taking into account the time-varying level of the interference 320 due to, e.g., different transmit power employed for transmission at the downlink radio channel 310-2.

In a scenario as depicted in FIG. 6B, it may be expedient to calculate the weights $W_{group2}$ and $W_{group3}$ differently from $W_{group1}$. In particular, it may be possible to use the equalizer weight $W_{group1}$ for all symbols 240-1 to 240-14. This may be the case when the level of interference 230 from the downlink radio channel 310-2 does not vary significantly during the duration of a subframe 250 of the uplink radio channel 310-1. In particular, the level of interference 230 may be included in the signal covariance $\hat{R}_1$, e.g., if payload data is transmitted on the downlink radio channel 310-2 (cf. FIG. 6B).

Above one possible way of performing the interference mitigation has been shown. Below, a further approach of performing the interference mitigation based on the measurements 801, 802, 803 is shown. In this further scenario, it is possible to detect, based on the second measurement 802, the reference signals y transmitted on the downlink radio channel 310-2. Said estimating of the interference 320 from the downlink radio channel 310-2 then depends on the detected reference signals y transmitted on the downlink radio channel 310. Detecting of said reference signals may include decoding of the reference signals.

For example, it is possible that said detecting of the reference signals y transmitted on the downlink radio channel 310-2 further comprises obtaining at least one of the following: an indication of the reference signals $x_{DL,CRS}$ transmitted on the downlink radio channel 320-2; a temporal position of the reference signals transmitted on the downlink radio channel 320-2; a frequency position of the reference signals transmitted on the at least one further radio channel 320-2; a number of transmitting antennas and/or receiving antennas employed for sending or receiving at the downlink radio channel 310-2; a transmit signal power employed for transmission at the downlink radio channel 310-2; scheduling information of the downlink radio channel 310-2.

Then it is possible to calculate the channel matrix 560 (cf. FIG. 2B):

$$\hat{h}_{DL}^* = x_{DL,CRS}^H y. \quad (9)$$

In other words, $x_{DL,CRS}$ is the reference signal transmitted on the downlink radio channel 320-2 known by the eNodeB 301-1, e.g., by obtaining it via the data communication established with eNodeB 302-1 (cf. FIG. 1B).

Based on the channel matrix 560 of equation 9, it is possible to calculate the interference 320 from the downlink radio channel 320-2 according to:

$$\hat{R}_{DL,CRS} = P_{DL,CRS} \hat{h}_{DL}^* \hat{h}_{DL}^{H*} = \hat{R}_{12}, \text{ and} \quad (10)$$

$$\hat{R}_{DL,PDCCH} P_{DL,PDCCH} \hat{h}_{DL}^* \hat{h}_{DL}^{H*} = \hat{R}_{13}. \quad (11)$$

Here $P_{DL,CRS}$ is the transmission power employed for reference signal transmission at the downlink radio channel 310-2 and $P_{DL,PDCCH}$ is the transmission power employed for control data transmission at the downlink radio channel 310-2. These values are known to the eNodeB 301-1, e.g., from a data transmission from the eNodeB 301-2.

In equations 10 and 11 a comparably simple scenario is discussed, where the same channel matrix 560, i.e., $\hat{h}_{DL}$ is used for both calculations of the interference 320. However, it is also possible to use different channel matrices 560 for the calculations in the equations 10 and 11. For example, this may be possible by calculating two channel matrices 560 using equation 9 by detecting of the various signals y at the eNodeB 302-1, in particular signals y which are transmitted employing reference signal resource elements 201-3b and payload data resource elements 201-1b of the downlink radio channel 310-2. This may increase an accuracy of the calculation as the channel matrices 560 are considered more precisely.

As can be seen, based on the reference signals transmitted on the downlink radio channel 310-2, it is possible to directly calculate the interference 320 from the downlink radio channel 310-2. Using the equations 6-8, it is again possible to perform the interference mitigation based on the values obtained from equations 10 and 11.

In yet a further scenario, it is possible to solves equations 2 and 3 directly for the interference 320 from the downlink radio channel 320-2, according to:

$$\hat{R}_{DL,CRS} = \hat{R}_2 - P_{UL} \cdot h_{UL} h_{UL}^H, \text{ and} \quad (12)$$

$$\hat{R}_{DL,PDCCH} = \hat{R}_3 - P_{UL} \cdot h_{UL} h_{UL}^H. \quad (13)$$

Here it is assumed that $R_n \approx 0$. In other words, based on the channel characteristics of the uplink radio channel 310-1 and based on the signal covariance of reception of the uplink radio channel 310-1 the interference 320 from the downlink radio channel 320-2 is estimated.

More generally, as can be seen from a comparison of the scenarios underlying equations 4 and 5 versus 10 and 11 versus 12 and 13, various approaches are possible for estimating the interference 320 from the downlink radio channel 320-2. The underlying concept is founded on the awareness that—due to the predefined time-alignment of the uplink and downlink radio channels 310-1, 310-2—different resource elements 201 of the uplink radio channel 310-1 experience the different levels of interference 320. It becomes possible to handle the interference mitigation correspondingly for resource elements 201 belonging to the same groups 101-1/101-2, 102, 103; these groups 101-1/101-2, 102, 103 being defined with respect to substantially same levels of interference 320.

Figure 7:
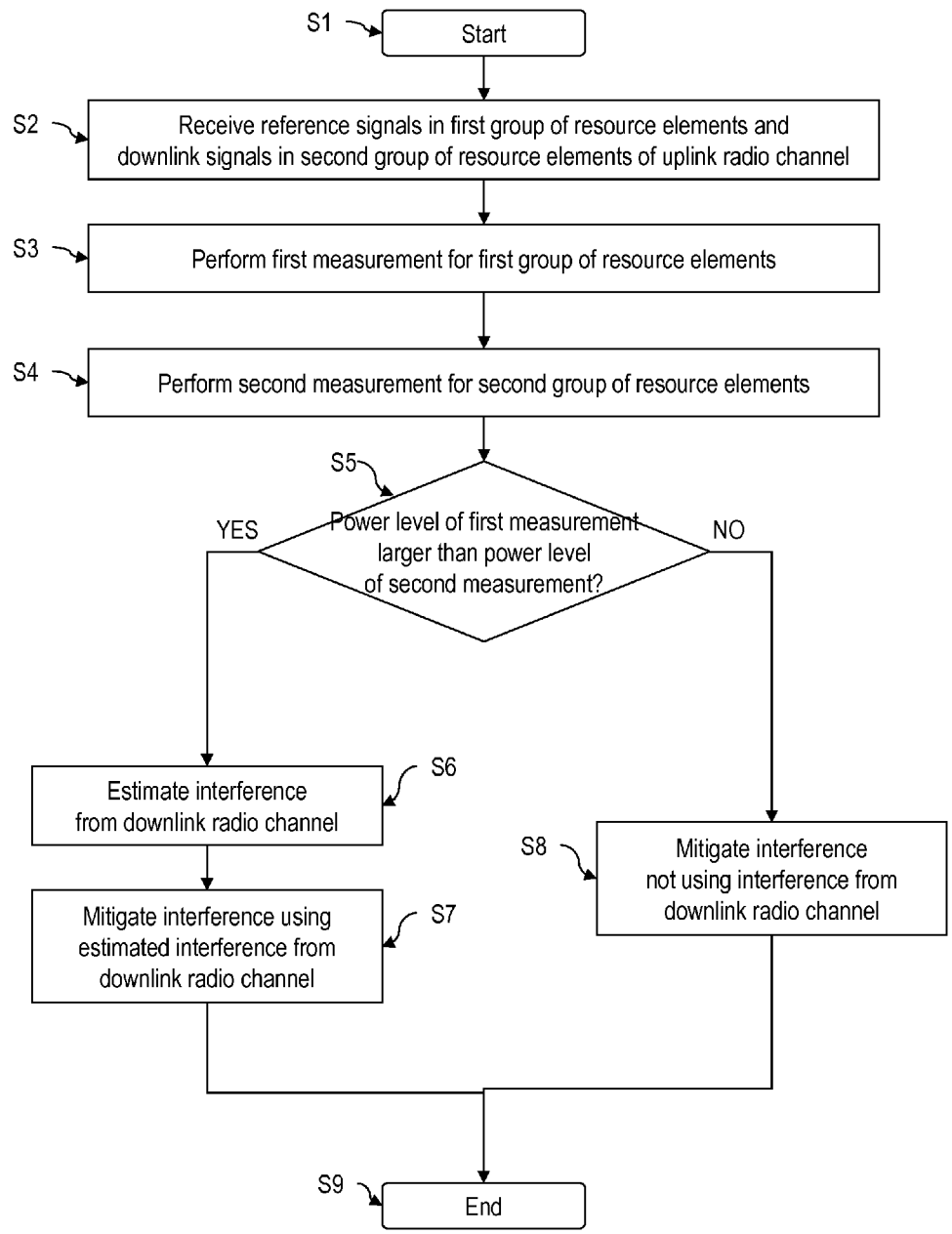
FIG. 7 is a flowchart illustrating a method of signal transmission according to an embodiment, the method including interference mitigation on a radio channel.

In FIG. 7, a flowchart of a method of transmitting data on a radio channel, e.g., the uplink radio channel 310-1, is depicted. The method starts with step S1. In step S2, signals transmitted on the uplink radio channel 310-1 are received, e.g., by the eNodeB 310-1 (cf. FIG. 1B). The signals can relate to reference signals of the uplink radio channel 310-1 and/or payload data sent by the UE 302-1.

In step S3, the first measurement 801 is performed for the first group 101-1/101-2 of resource elements 201. In step S4, the second measurement 802 is performed for the second group 102 of resource elements 201.

More generally, the measurements of steps S3 and S4 may be performed partly or fully as part of said receiving of signals in step S2—or vice versa. Therefore, step S2 may be considered optional. Yet, it is not necessary to perform the measurements of steps S3 and S4 for all resource elements 201 of a subframe 250. Rather, it may be sufficient to perform the measurements of steps S3 and S4 for one resource element 201/symbol per group.

In step S5, the power levels 500-1, 500-2 of the first and second measurements 801, 802 are compared (cf. FIGS. 6A, 6B). If a difference of the power levels 500-1, 500-2 is smaller than a predefined threshold, in step S8 conventional techniques of performing the interference mitigation are performed according to various reference implementations.

For example, this may include detecting of the reference signals transmitted on the uplink radio channel 310-1, e.g., from step S2 and/or step S3. Based on these detected reference signals of the uplink radio channel 310-1, it is possible to estimate an integral level of interference and use this integral level of interference for the performing of the interference mitigation, e.g., in a uniform manner for all resource elements 201 of the subframe 250 without distinguishing between different resource elements 201.

However, if in step S5 the difference of the power levels 500-1, 500-2 is larger than a predefined threshold, the method may commence step S6. In step S6, the interference 320 from the downlink radio channel 310-2 is estimated. Various solutions have been presented above which enable to estimate the interference 320 from the downlink radio channel 310-1—in particular, in a manner which distinguishes between the various levels of interference 320 present for the different groups 101-1/101-2, 102, 103 of resource elements 201 transmitted on the uplink radio channel 310-1. These solutions are discussed below with respect to the flowcharts of FIGS. 8A, 8B, 8C, which relate to further details according to the various solutions of step S6 of FIG. 7.

Figure 8A:
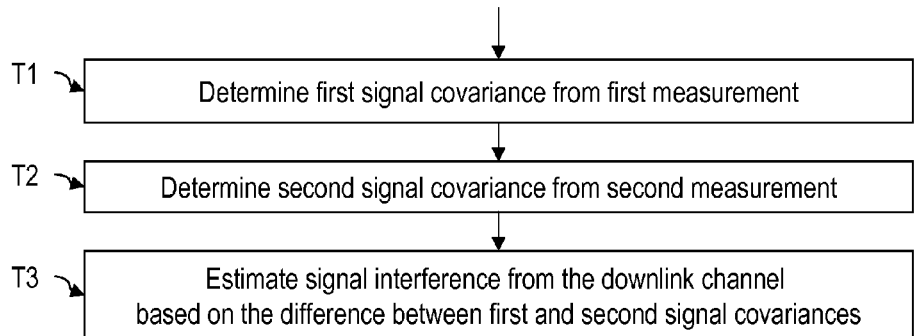
FIG. 8A is a flowchart illustrating further details relating to the interference mitigation of FIG. 7.

For example, according to the solution as depicted in the flowchart of FIG. 8A, it is possible to determine first and second signal covariances for reception of the uplink radio channel 310-1 from the first and second measurements 801, 802, respectively (steps T1, T2). Based on a difference between the first and second signal co-variances of steps T1 and T2, it is possible to estimate the signal interference 320 from the downlink radio channel 310-2 (step T3). This corresponds to the calculation of the equations 4 and 5 as discussed above.

Figure 8B:
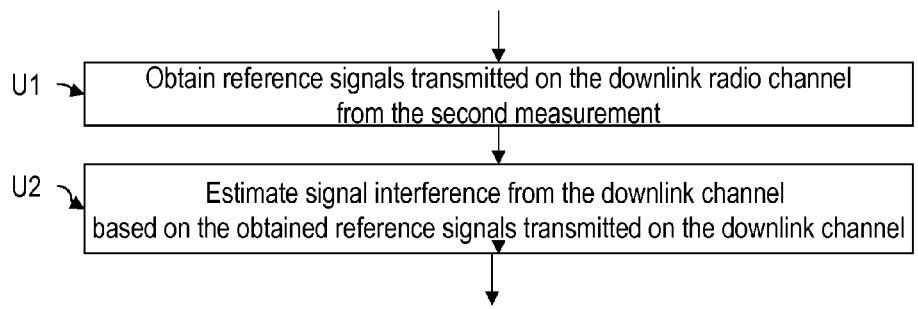
FIG. 8B is a flowchart illustrating further details relating to the interference mitigation of FIG. 7.

In FIG. 8B, a further solution to estimate the interference 320 from the downlink radio channel 310-1 is depicted. In step U1, reference signals transmitted on the downlink radio channel 310-2 are detected based on the second measurement 802. For example, based on the detected reference signals, it is possible to estimate the channel characteristics 560 of the interference caused by the downlink radio channel 310-2 as present on the uplink radio channel 310-1. To this respect, reference is made to equation 9 as discussed above. In step U2, it is possible to estimate the signal interference 320 from the downlink radio channel 310-2 based on the detected reference signal transmitted on the downlink radio channel 310-2. Reference is made to the equations 10 and 11 as discussed above.

Figure 8C:
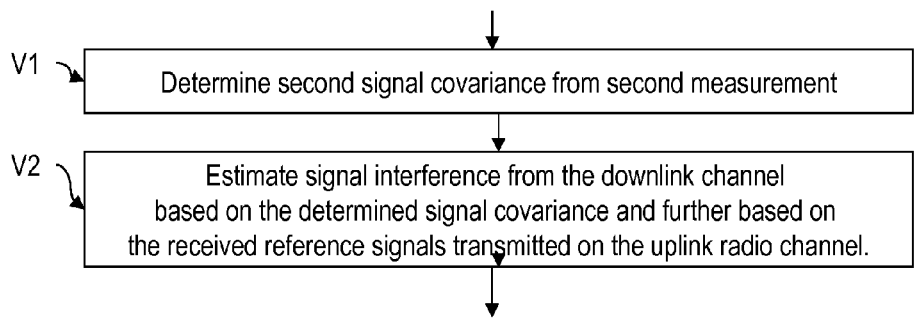
FIG. 8C is a flowchart illustrating further details relating to the interference mitigation of FIG. 7.

Turning to FIG. 8C, yet a further solution of estimating the interference 320 from the downlink radio channel 310-2 is discussed. In step V1, a second signal co-variance for reception of the uplink radio channel 310-1 is determined based on the second measurement 802. The signal interference 320 from the downlink radio channel 310-2 is estimated in step V2 based on the determined signal covariance of step V1 and further based on the received reference signals transmitted on the uplink radio channel 310-1 (e.g. as received in step S2 of FIG. 7 and/or as determined based on the performed first measurement 801 of step S3). From a difference of these values it is possible to estimate the interference 320 from the downlink radio channel 320-2. To this respect, reference is made to the equations 12 and 13 as discussed above.

Referring back to FIG. 7, based on the estimated interference 320 in step S6, e.g. according to one of the solutions as discussed above with respect to the FIGS. 8A-8C, it is possible to mitigate the interference in step S7 taking into account the estimated interference 320 from the downlink radio channel 310-2.

For example, in case the signals are transmitted on the uplink radio channel 310-1 using OFDM encoding, this may include applying equalization to the received signals of the subframe 250. The equalizer weights of the applied equalization can be determined individually for the received signals relating to the resource elements 201 of the first group 101-1, 101-2 and relating to resource elements 201 of the second group 102, based on the estimated interference 320 of step S6. For the scenario of a 3GPP LTE mobile communication network 300, the calculation of equalizer weights has been shown in the equations 6, 7 and 8 as discussed above. In general, it should be appreciated that the interference mitigation in step S7 is performed separately for the first group 101-1/101-2 of the one or more resource elements 201 and for the second and third groups 102, 103 of the one or more resource elements 201, respectively. This enables to individually take care of the various levels of interference present on the uplink radio channel 310-1 due to different transmission properties of the reference signals, control data, and payload data resource elements on the downlink radio channel 310-2 (cf. FIGS. 6A, 6B).

As will be appreciated, in the above techniques have been discussed which enable to reduce impairment of transmission on a radio channel which is caused by interference from one or more interfering further radio channels. This is done by performing interference mitigation differently for different resource elements of the radio channel. Treating different resource elements differently in the interference mitigation allows considering different levels of interference from the interfering further radio channel(s).

While specific examples were discussed above, it should be understood that these are susceptible to various changes and modifications.

For example, the various scenarios have been primarily discussed with respect to a mobile communication network 300 according to the 3GPP LTE standard. However, it should be appreciated that the respective techniques can be readily applied to mobile communication networks 300 operating according to different standards, e.g., according to the 3GPP UMTS standard. In latter scenario, it may be possible that functionality is distributed between the RNC and NodeB (cf. FIG. 1A). For example, receiving and some larger or smaller part of the estimation of interference may be executed by the NodeB, while the RNC may or may not execute other tasks, e.g., computationally expensive calculations. Accordingly, the NodeB and RNC may be regarded as a single node for implementing the above-described concepts.

Moreover, the concepts have been primarily explained with respect to a situation as depicted in FIGS. 1A, 1B, i.e., a situation where an uplink radio channel 310-1 is subject to interference from a downlink radio channel 310-2. However, the concepts may also be applied to various other situations, e.g., to a situation where a downlink radio channel is subject to interference from an uplink radio channel. Also, scenarios are possible where a radio channel is subject to interference from at least one further radio channel where the subframe of the radio channel and the at least one further radio channel have a certain temporal delay with respect to each other. Also in such a situation it may be possible to group the resource elements of the subframe transmitted on the radio channel into groups corresponding to different levels of interference.

Still further, while in the above the interference mitigation was mainly discussed in terms of interference compensation employing equalization techniques, other interference mitigation techniques could be applied as well, using the estimated interference from the at least one further radio channel. In particular, because it may be possible to single out the contribution of the interference from the at least one further radio channel from other contributions of interference, it becomes possible to flexibly perform the interference mitigation using this information.

The invention claimed is:

1. A method of signal transmission on a radio channel between a user equipment and a mobile communication network, the method comprising:
receiving signals subject to interference from transmissions from at least one further radio channel between at least one further user equipment and the mobile communication network, the signals received in a subframe of the radio channel, the subframe comprising a first group of one or more resource elements and a second group of one or more resource elements,
wherein the first group of resource elements is subject to a first level of interference from the at least one further radio channel, and
wherein the second group of resource elements is subject to a second level of interference from the at least one further radio channel,
performing a first measurement of transmission power for at least one of the resource elements of the first group and performing a second measurement of transmission power for at least one of the resource elements of the second group,
depending on the first measurement and on the second measurement, estimating interference from the at least one further radio channel, wherein estimating interference comprises performing operations to estimate the effect of the first level of interference due to data transmission on the at least one further radio channel, and performing operations to estimate the effect of the second level of interference due to transmission of reference signals on the at least one further radio channel, and
on the basis of the estimated interference, performing operations to mitigate interference on the received signals of the radio channel.

2. The method of claim 1,
wherein the first measurement reflects the first level of interference from the at least one further radio channel and further reflects channel characteristics of the radio channel,
wherein the second measurement reflects the second level of interference from the at least one further radio channel and further reflects the channel characteristics of the radio channel, and
wherein the interference from the at least one further radio channel is estimated from a difference of the first measurement and the second measurement.

3. The method of claim 2,
wherein the method further comprises determining a first signal covariance for reception of the radio channel based on the first measurement,
wherein the method further comprises determining a second signal covariance for reception of the radio channel based on the second measurement, and
wherein the first and second signal covariances include contributions from the channel characteristics of the radio channel and the interference from the further radio channel.

4. The method of claim 1,
wherein the method further comprises:
based on the second measurement, detecting the reference signals transmitted on the at least one further radio channel,
wherein said estimating of the interference from the at least one further radio channel depends on the detected reference signals transmitted on the at least one further radio channel.

5. The method of claim 4,
wherein said detecting of the reference signals transmitted on the at least one further radio channel further comprises obtaining at least one of the following:
a number of transmitting antennas and/or receiving antennas employed for transceiving at the at least one further radio channel;
a transmit signal power employed for transmission at the at least one further radio channel;
a temporal position of the reference signals transmitted on the at least one further radio channel;
a frequency position of the reference signals transmitted on the at least one further radio channel; and
scheduling information of the at least one further radio channel.

6. The method of claim 1,
wherein the data transmission on the at least one further radio channel employs a first transmission power, and
wherein the reference signal transmission on the at least one further radio channel employs a second transmission power which is larger than the first transmission power.

7. The method of claim 1,
wherein the received signals in the first group of said one or more resource elements of the radio channel comprise reference signals of the radio channel, and
wherein the interference mitigation and/or said estimating of the interference from the at least one further radio channel is further performed on the basis of the received reference signals of the radio channel.

8. The method of claim 7,
wherein the interference from the at least one further radio channel is estimated from:
channel characteristics of the radio channel which are determined from the received reference signals of the radio channel; and
a signal covariance of reception of the radio channel which is determined based on the first measurement and/or based on the second measurement.

9. The method of claim 1,
wherein the received signals are transmitted on the radio channel using Orthogonal Frequency-Division Multiplexing, OFDM, encoding, and
wherein said performing of the interference mitigation includes:
applying equalization to the received signals of the subframe, wherein equalizer weights of the applied equalization are determined individually for the received signals relating to resource elements of the first group and relating to resource elements of the second group based on the estimated interference from the at least one further radio channel.

10. The method of claim 1,
wherein the method further comprises:
  comparing a power level of the first measurement and a power level of the second measurement, and
  depending on said comparing, selectively performing the interference mitigation on the received signals on the basis of the estimated interference from the at least one further radio channel.

11. The method of claim 1,
wherein the estimated interference from the at least one further radio channel is proportional to a signal covariance contribution for reception of the radio channel and caused by the at least one further radio channel.

12. The method of claim 1,
wherein the method further comprises:
  obtaining an indication of a temporal alignment of the subframes of the radio channel with respect to subframes of the further radio channel, and
wherein a point of time of the first measurement and a point of time of the second measurement are set depending on the obtained indication.

13. The method of claim 1,
wherein the first level of interference from the at least one further radio channel is estimated to be zero.

14. The method of claim 1,
wherein the interference mitigation is performed separately for the first group of the one or more resource elements and for the second group of the one or more resource elements.

15. The method of claim 1,
wherein the radio channel is an uplink radio channel between the user equipment and an access node of the mobile communication network.

16. The method of claim 1,
wherein the further radio channel is a downlink radio channel between a further access node of the mobile communication network and the further user equipment.

17. The method of claim 1,
wherein the received signals in the subframe of the radio channel comprising at least a third group of one or more resource elements,
wherein the third group of resource elements is subject to a third level of interference from the at least one further radio channel,
wherein the method further comprises:
  performing a third measurement for at least one of the resource elements of the third group, and
wherein said estimating of the interference from the at least one downlink radio channel further depends on the third measurement.

18. A network node of a mobile communication network, the network node comprising:
  an interface configured for receiving signals subject to interference from transmissions from at least one further radio channel between at least one further user equipment and the mobile communication network, the signals received in a subframe of a radio channel, the subframe comprising a first group of one or more resource elements and a second group of one or more resource elements,
  wherein the first group of resource elements is subject to a first level of interference from the at least one further radio channel, and
  wherein the second group of resource elements is subject to a second level of interference from the at least one further radio channel,
  at least one processor which is configured to:
    perform a first measurement of transmission power for at least one of the resource elements of the first group and perform a second measurement of transmission power for at least one of the resource elements of the second group,
    depending on the first measurement and on the second measurement, estimate interference from the at least one further radio channel, wherein estimating interference comprises performing operations to estimate the effect of the first level of interference, which is due to data transmission on the at least one further radio channel, and performing operations to estimate the effect of the second level of interference, which is due to transmission of reference signals on the at least one further radio channel, and
    on the basis of the estimated interference, perform operations to mitigate interference on the received signals of the radio channel.

19. The network node of claim 18,
wherein the network node is a user equipment or an access node of the mobile communication network.

* * * * *